UNITED STATES PATENT OFFICE.

MILTON C. WHITAKER, OF NEW YORK, N. Y., ASSIGNOR TO U. S. INDUSTRIAL ALCOHOL CO., A CORPORATION OF WEST VIRGINIA.

PROCESS OF OBTAINING ALCOHOL AND POTASSIUM COMPOUNDS.

1,376,662.     Specification of Letters Patent.     Patented May 3, 1921.

No Drawing.     Application filed January 12, 1918. Serial No. 211,624.

*To all whom it may concern:*

Be it known that I, MILTON C. WHITAKER, of New York city, in the county of New York, and in the State of New York, have invented a certain new and useful Improvement in Processes of Obtaining Alcohol and Potassium Compounds, and do hereby declare that the following is a full, clear, and exact description thereof.

My invention relates particularly to a process of obtaining alcohol and potash by the fermentation of many different materials, although it has application especially to the fermentation of molasses.

The object of my invention is to provide an advantageous process of the above character in which undesirable fermentations will be inhibited, while, at the same time, the potassium present in the distillery waste or slop may be recovered by the aid of the reagent which was added to bring about the inhibition of the undesirable fermentation.

Further objects of my invention will appear from the detailed description thereof contained hereinafter.

While my invention is capable of embodiment in many different forms, for the purpose of illustration I shall describe only one form of the same hereinafter.

For example, I may proceed as follows in carrying out my invention: Molasses, as for example the molasses obtained from the manufacture of cane sugar, may be prepared for fermentation and distillation in the usual manner, as for example by dilution with water in the proportion of 1,000 parts by weight of molasses to 5,000 parts by weight of water. This may or may not be acidified by the addition of one part by weight of sulfuric acid, having a strength of 66° Bé. Thereupon I add an amount of hydrofluosilicic acid equal to .06% by weight of the remainder of the ingredients, said acid being the commercial hydrofluosilicic acid, containing substantially 30% $H_2SiF_6$. Thereupon the mass is allowed to ferment. The presence of the hydrofluosilicic acid does not interfere with the production of the alcohol in the fermentation, nor is it sufficient to bring about the precipitation of the potassium present, but it is present in sufficient quantity to prevent the undesirable fermentations, as it acts as a bacteria poison.

If desired, in order to bring about the fermentation in the most advantageous manner, the fermentation may be conducted with the addition of a yeast which has been accustomed to the presence of hydrofluosilicic acid or hydrofluoric acid.

After the fermentation has been completed, the distillation to recover the alcohol may be carried out in the usual manner. The distillery waste or slop which remains may then be treated by adding thereto an additional quantity of the hydrofluosilicic acid sufficient to precipitate the potassium in the form of a salt of the hydrofluosilicic acid. For this purpose, sufficient of the commercial hydrofluosilicic acid, containing approximately 30% $H_2SiF_6$, may be added at this point, so that the total hydrofluosilicic acid added in the process, including that added before fermentation, may amount to six parts by weight of the 30% hydrofluosilicic acid to one part by weight of the potassium oxid ($K_2O$) in the distillery waste or slop. The salt thus precipitated may be freed from hydrofluosilicic acid by heating with sulfuric acid, in the proportion of one part by weight of sulfuric acid of 66° Bé. to ten parts by weight of the precipitate. The hydrofluosilicic acid will thus be driven off, and there will remain a quantity of potassium sulfate mixed with some calcium sulfate and organic matter. The potassium salts can be purified in any desired manner, as for example by leaching with hot water, filtering and crystallizing.

If desired, furthermore, the recovery of the hyrdofluosilicic acid from the potassium salt thereof may be carried out in accordance with the process set forth in my application upon process of obtaining potash, Serial Number 209606, filed December 31, 1917.

While I have described my invention above in detail, I wish it to be understood that many changes may be made therein without departing from the spirit thereof,

I claim:

1. The process which comprises fermenting and distilling a liquid containing potassium salts having added thereto hydrofluosilicic acid in an amount sufficient to inhibit undesirable fermentations.

2. The process which comprises fermenting and distilling a liquid containing potassium salts having added thereto hydrofluosilicic acid in a quantity insufficient to remove the potassium but sufficient to inhibit undesirable fermentations.

3. The process which comprises fermenting and distilling a liquid containing potassium salts having added thereto hydrofluosilicic acid in an amount sufficient to inhibit undesirable fermentations and then adding to the distillery waste or slop an additional quantity of hydrofluosilicic acid sufficient to precipitate potassium compounds.

4. The process which comprises fermenting and distilling a liquid containing potassium salts having added thereto hydrofluosilicic acid in a quantity insufficient to remove the potassium but sufficient to inhibit undesirable fermentations and then adding to the distillery waste or slop an additional quantity of hydrofluosilicic acid sufficient to precipitate potassium compounds.

5. The process which comprises fermenting and distilling a liquid containing potassium salts having added thereto hydrofluosilicic acid in an amount sufficient to inhibit undesirable fermentations and then adding to the distillery waste or slop an additional quantity of hydrofluosilicic acid sufficient to combine with all of the potassium present.

6. The process which comprises fermenting and distilling a liquid containing potassium salts having added thereto hydrofluosilicic acid in a quantity insufficient to remove the potassium but sufficient to inhibit undesirable fermentations and then adding to the distillery waste or slop an additional quantity of hydrofluosilicic acid sufficient to combine with all of the potassium present.

7. The process which comprises fermenting and distilling a liquid containing potassium salts having added thereto hydrofluosilicic acid in an amount sufficient to inhibit undesirable fermentations, then adding to the distillery waste or slop an additional quantity of hydrofluosilicic acid sufficient to precipitate potassium compounds, and then liberating the hydrofluosilicic acid from the precipitate by the addition of an acid.

8. The process which comprises fermenting and distilling a liquid containing potassium salts having added thereto hydrofluosilicic acid in a quantity insufficient to remove the potassium but sufficient to inhibit undesirable fermentations, then adding to the distillery waste or slop an additional quantity of hydrofluosilicic acid, and then liberating the hydrofluosilicic acid from the precipitate by the addition of an acid.

9. The process which comprises fermenting and distilling a liquid containing potassium salts having added thereto hydrofluosilicic acid in an amount sufficient to inhibit undesirable fermentations, then adding to the distillery waste or slop an additional quantity of hydrofluosilicic acid sufficient to combine with all of the potassium present, and then liberating the hydrofluosilicic acid from the precipitate by the addition of an acid.

10. The process which comprises fermenting and distilling a liquid containing potassium salts having added thereto hydrofluosilicic acid in a quantity insufficient to remove the potassium but sufficient to inhibit undesirable fermentations, then adding to the distillery waste or slop an additional quantity of hydrofluosilicic acid sufficient to combine with all of the potassium present, and then liberating the hydrofluosilicic acid from the precipitate by the addition of an acid.

11. The process which comprises fermenting and distilling a liquid containing potassium salts having added thereto hydrofluosilicic acid in an amount sufficient to inhibit undesirable fermentations, then adding to the distillery waste or slop an additional quantity of hydrofluosilicic acid sufficient to precipitate potassium compounds, then liberating the hydrofluosilicic acid from the precipitate by the addition of an acid, and then purifying the potassium salts remaining.

12. The process which comprises fermenting and distilling a liquid containing potassium salts having added thereto hydrofluosilicic acid in a quantity insufficient to remove the potassium but sufficient to inhibit undesirable fermentations, then adding to the distillery waste or slop an additional quantity of hydrofluosilicic acid sufficient to precipitate potassium compounds, then liberating the hydrofluosilicic acid from the precipitate by the addition of an acid, and then purifying the potassium salts remaining.

13. The process which comprises fermenting and distilling a liquid containing potassium salts having added thereto hydrofluosilicic acid in an amount sufficient to inhibit undesirable fermentations, then adding to the distillery waste or slop an additional quantity of hydrofluosilicic acid sufficient to combine with all of the potassium present, then liberating the hydrofluosilicic acid from the precipitate by the addition of an acid, and then purifying the potassium salts remaining.

14. The process which comprises fermenting and distilling a liquid containing potassium salts having added thereto hydrofluosilicic acid in a quantity insufficient to remove the potassium but sufficient to inhibit undesirable fermentations, then adding to the distillery waste or slop an additional quantity of hydrofluosilicic acid sufficient to combine with all of the potash present, then liberating the hydrofluosilicic acid from the precipitate by the addition of an acid, and then purifying the potassium salts remaining.

In testmony that I claim the foregoing I have hereunto set my hand.

MILTON C. WHITAKER.

Witnesses:
MINNIE ARMERDING,
G. R. TRAUTMAN.